Figure 1:
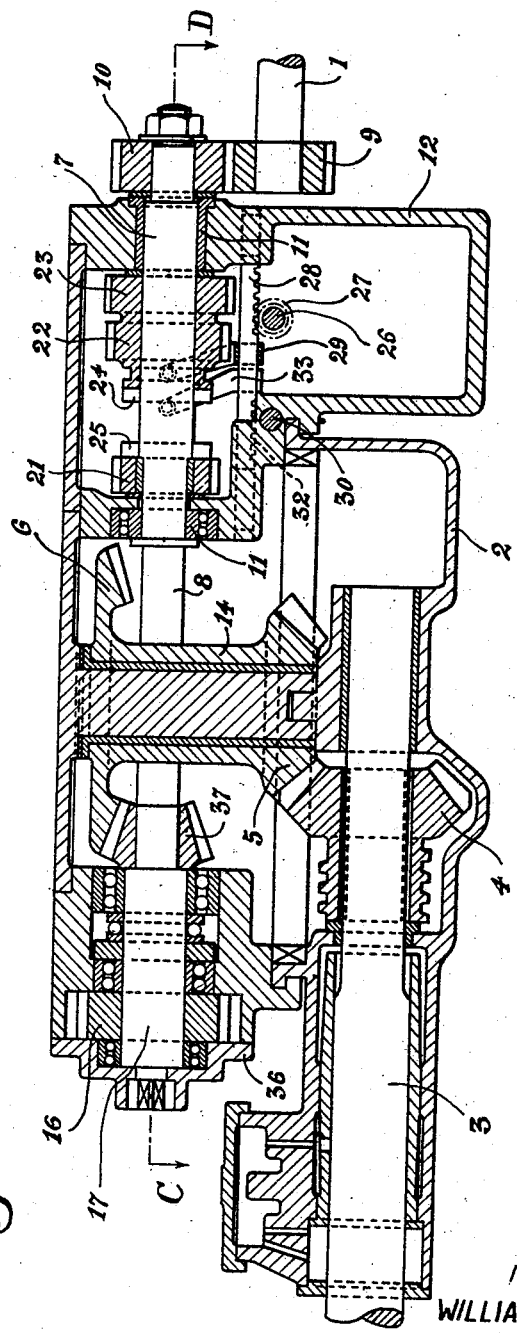
Figure 2:
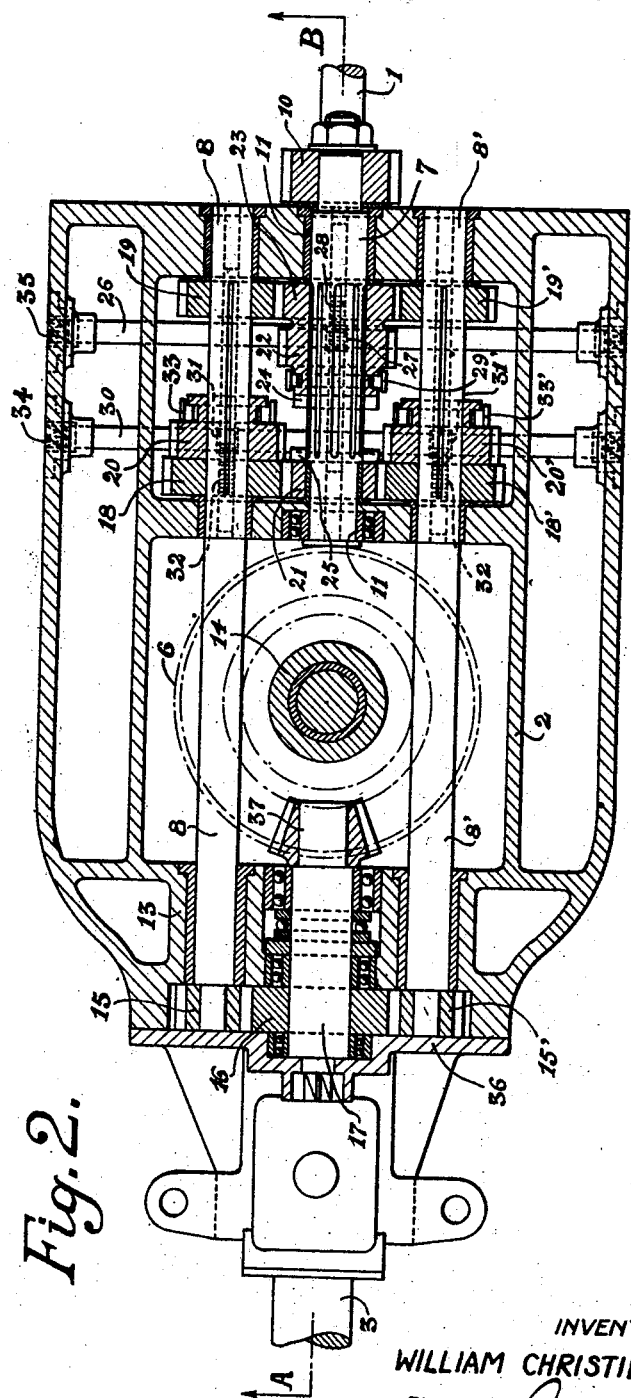
Figure 3:
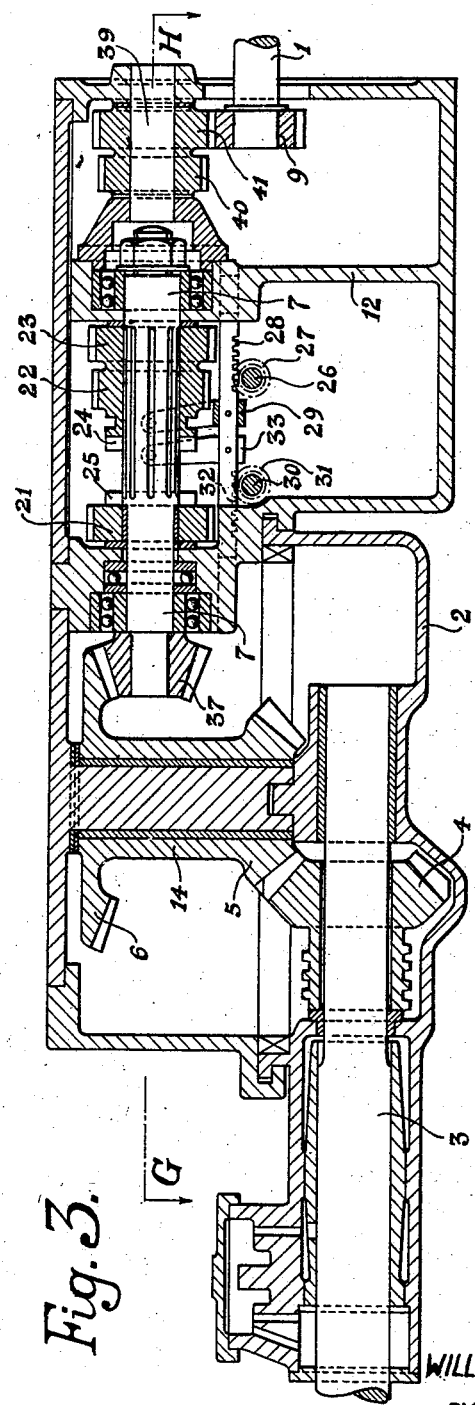
Figure 4:
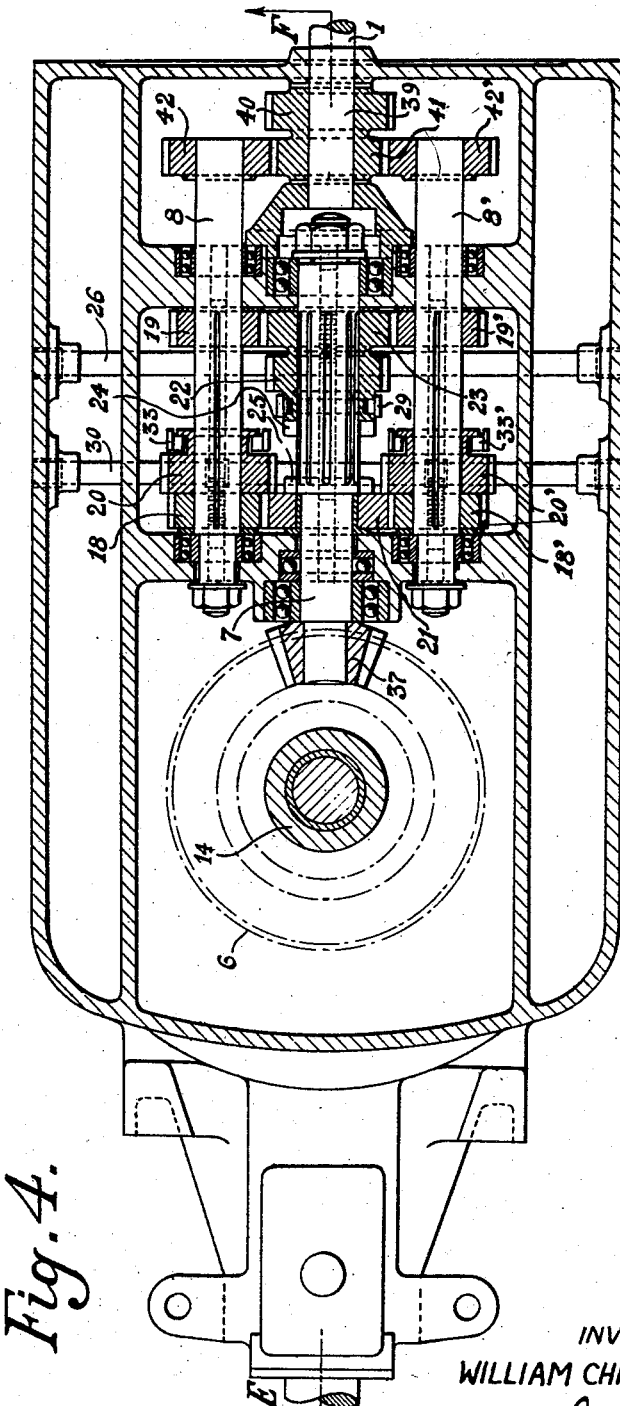

Sept. 1, 1931.　　　W. C. BLACK　　　1,821,372
COAL CUTTING MACHINE AND THE LIKE
Filed Dec. 9, 1926　　　4 Sheets-Sheet 2

INVENTOR
WILLIAM CHRISTIE BLACK
BY
ATTORNEY

Sept. 1, 1931.  W. C. BLACK  1,821,372

COAL CUTTING MACHINE AND THE LIKE

Filed Dec. 9, 1926  4 Sheets-Sheet 3

INVENTOR
WILLIAM CHRISTIE BLACK
BY
ATTORNEY

Sept. 1, 1931. W. C. BLACK 1,821,372
COAL CUTTING MACHINE AND THE LIKE
Filed Dec. 9, 1926 4 Sheets-Sheet 4

INVENTOR
WILLIAM CHRISTIE BLACK
BY
ATTORNEY